(12) United States Patent  
Sugita

(10) Patent No.: US 7,003,020 B2
(45) Date of Patent: Feb. 21, 2006

(54) SELECTION OF MULTIPLE PROPAGATION PATHS BY SUCCESSIVE REMOVAL AND DETECTION OF HIGH AUTOCORRELATIONS

(75) Inventor: Naohiko Sugita, Tokyo (JP)

(73) Assignee: NEC Corporation, Tokyo (JP)

(*) Notice: Subject to any disclaimer, the term of this patent is extended or adjusted under 35 U.S.C. 154(b) by 766 days.

(21) Appl. No.: 10/061,337

(22) Filed: Feb. 4, 2002

(65) Prior Publication Data

US 2002/0106039 A1    Aug. 8, 2002

(30) Foreign Application Priority Data

Feb. 5, 2001    (JP)    ............. 2001-028262

(51) Int. Cl.
H04B 1/69    (2006.01)
(52) U.S. Cl. .................. 375/150; 375/148
(58) Field of Classification Search ............. 375/140, 375/142, 143, 147, 148, 150, 152, 316, 130, 375/144; 370/335, 342, 441

See application file for complete search history.

(56) References Cited

U.S. PATENT DOCUMENTS 6,163,563 A * 12/2000 Baker et al. ............... 375/130
6,795,422 B1 * 9/2004 Ohsuge ..................... 370/342
6,829,291 B1 * 12/2004 Imaizumi ................... 375/150

FOREIGN PATENT DOCUMENTS

JP    A 10-308688    11/1998
WO    99/35763    7/1999

OTHER PUBLICATIONS

Sourour, E. et al.: "Delay Tracking for Direct Sequence Spread Spectrum Systems in Multipath Fading Channels", Vehicular Technology Conference, May 1999, pp. 422-426, XP010341907.

Koulakiotis, D. et al.: "Data Detection Techniques for DS/CDMA Mobile Systems: A Review", IEEE Personal Communications, Jun. 2000, vol. 7, No. 3, pp. 24-34, XP-000947007.

* cited by examiner

Primary Examiner—Tesfaldet Bocure
Assistant Examiner—Vineeta Panwalkar
(74) Attorney, Agent, or Firm—Young & Thompson

(57) ABSTRACT

In a spread spectrum receiver, a received signal is despread by a correlator to produce multiple delay profiles, or a sum of autocorrelations, corresponding to multiple propagation paths of the signal. Subtractors are connected in successive stages from the output of the correlator. Corresponding to the subtractors, path searchers are connected to successive taps of the subtractors for respectively detecting the delay profiles produced by the correlator. In each subtractor the output of the corresponding path searcher is subtracted from the output of the subtractor of preceding stage. RAKE fingers are provided for despreading the received signal at delay times respectively determined by the delay profiles detected by the path searchers. The despread signals are maximal-ratio combined.

5 Claims, 2 Drawing Sheets

SELECTION OF MULTIPLE PROPAGATION PATHS BY SUCCESSIVE REMOVAL AND DETECTION OF HIGH AUTOCORRELATIONS

BACKGROUND OF THE INVENTION

1. Field of the Invention

The present invention relates generally to a technique for detecting delay times of multiple propagation paths for despreading a spread spectrum signal, and more specifically to a path selection technique useful for detecting delay times of propagation paths which are so closely spaced apart that they cannot be easily separated from each other with clear distinction.

2. Description of the Related Art

Mobile communication system are characterized by multipath propagation of transmitted signals. In a spread spectrum or CDMA (code division multiple access) system, RAKE combining technique is usually employed for combining signals arriving on multiple propagation paths. This technique is used to improve the quality of reception with a minimum level of transmission power, and hence to achieve high utilization efficiency of frequency resource. For RAKE combining it is important to select propagation paths which yield high autocorrelation values.

In the prior art path selection technique, a "path range" is defined, as shown in FIG. 1, for a selected propagation path as a guard interval to protect it from being mistakenly detected as multiple paths. In a stringent multipath environment, strong signals of different propagation paths may arrive within the same chip interval. However, if multiple strong signals arrive within the same guard interval, they cannot be distinguished and separated from each other. Signals that yield high autocorrelation values may be lost and maximal-ratio combining loses its significance. If one of two strong signals is lost, the maximal-ratio combined signal would be degraded by 3 dB.

SUMMARY OF THE INVENTION

It is therefore an object of the present invention to provide a technique for selecting multiple propagation paths with clear distinction even though their signals are arriving at close intervals.

According to a first aspect of the present invention, there is provided a path selection method comprising the steps of (a) producing a plurality of delay profiles from a plurality of propagation paths of a transmitted radio frequency signal, (b) detecting a delay profile of highest peak amplitude from the delay profiles, (c) removing the detected delay profile from the delay profiles produced by step (a), and (d) repeating steps (b) and (c).

According to a second aspect, the present invention provides a path selector comprising a correlator that produces a plurality of delay profiles corresponding to a plurality of propagation paths of a transmitted radio frequency signal, a plurality of subtractors successively connected from the output of the correlator to form a plurality of successive taps, a plurality of path searchers respectively connected to the successive taps, each of the path searchers detecting a delay profile of highest peak amplitude from the corresponding tap, and a plurality of Nyquist filters corresponding to the subtractors and the path searchers. Each of the Nyquist filters produces a Nyquist response from the delay profile detected by the corresponding path searcher and supplies the Nyquist response to the corresponding subtractor.

According to a third aspect, the present invention provides a spread spectrum receiver comprising a correlator for despreading a received spread spectrum signal and producing therefrom a plurality of delay profiles corresponding to a plurality of propagation paths of the spread spectrum signal, a plurality of subtractors successively connected from the output of the correlator to form a plurality of successive taps, a plurality of path searchers respectively connected to the successive taps, each of the path searchers detecting a delay profile of highest peak amplitude from the corresponding tap, and a plurality of Nyquist filters corresponding to the subtractors and the path searchers. Each Nyquist filter produces a Nyquist response from the delay profile detected by the corresponding path searcher and supplies the Nyquist response to the corresponding subtractor. A plurality of RAKE fingers perform the despreading of the received spread spectrum signal at delay times respectively determined by the delay profiles detected by the path searchers. A maximal-ratio combiner is provided for combining output signals of the RAKE fingers.

BRIEF DESCRIPTION OF THE DRAWINGS

The present invention will be described in detail further with reference to the following drawings, in which.

DETAILED DESCRIPTION

Figure 2:
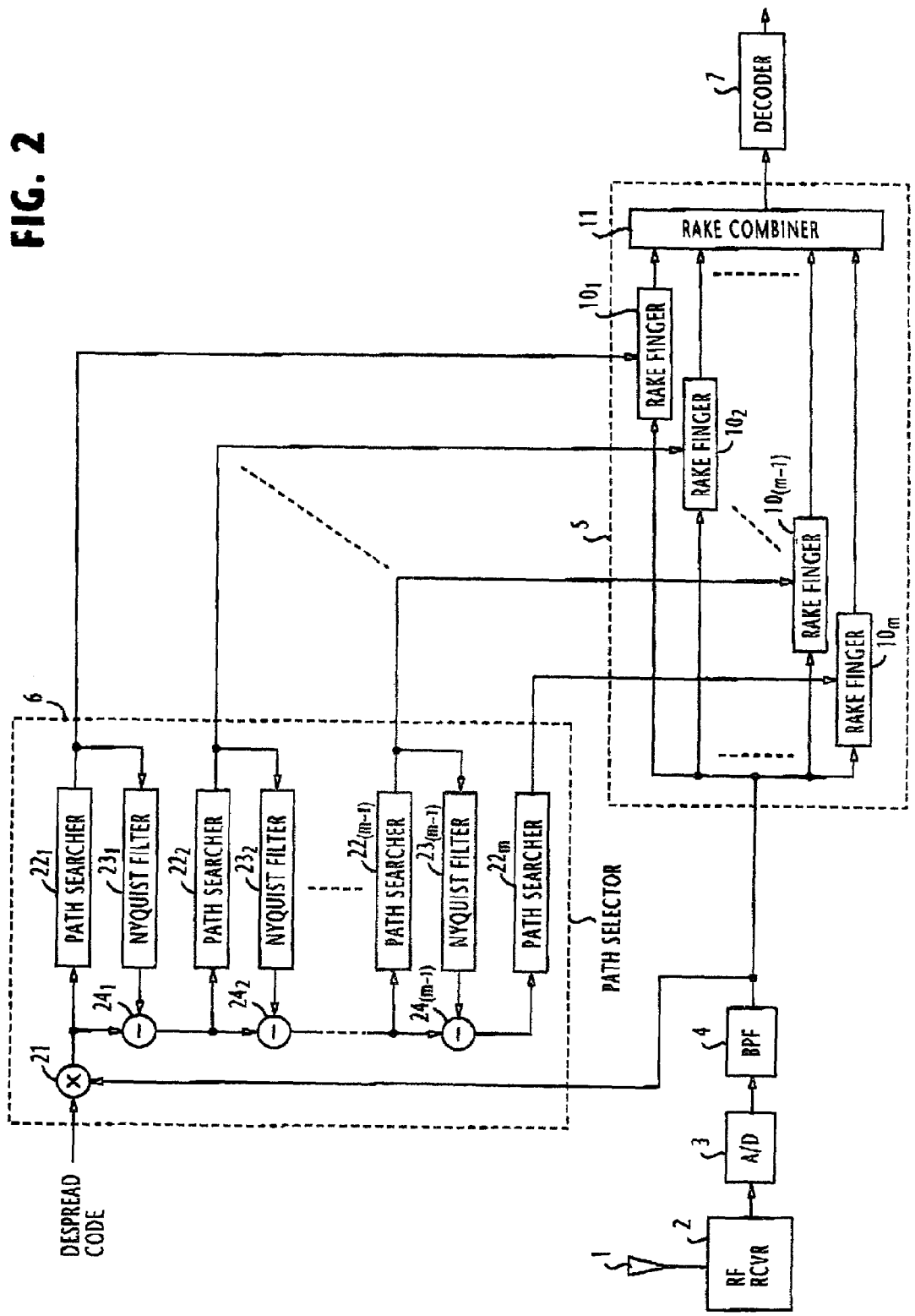
FIG. 2 is a block diagram of a spread spectrum receiver incorporating a path selection circuit of the present invention.

Referring to FIG. 2, there is shown a spread spectrum receiver according to the present invention. The receiver is comprised of an antenna 1 for receiving a spread spectrum signal propagated over a multipath fading channel, an RF receiver 2 for down-converting the received RF signal, an A/D converter 3 for converting the downconverted signal to digital form, and a band-pass filter 4 for limiting the frequencies of the digital signal to a predetermined bandwidth. The received spread spectrum signal is a quadrature (orthogonal) modulated complex signal such as phase-shift keying signal and a unique word is transmitted on one axis (or imaginary part) of the complex signal and a data signal is transmitted on the other axis (i.e., real part) of the complex signal.

The output signal of the band-pass filter 4 is supplied to a demodulator 5 and a path selector 6. Demodulator 5 includes a plurality of despreaders known as RAKE fingers $10_1$~$10_m$ and a RAKE combiner 11. These RAKE fingers are provided in a one-to-one correspondence to the output signals of path selector 6. Each RAKE finger essentially comprises a shift register and a correlator to which the output signal of band-pass filter 4 is supplied. The shift register is loaded with a PN (pseudonoise) code. The PN code is supplied to the correlator to despread the band-pass filter output at the timing of the corresponding output signal of path selector 6.

The output signals of the RAKE fingers $10_1$~$10_m$ are applied to a maximal-ratio combiner, or RAKE combiner 11. Rake combiner 11 estimates the respective channel responses of the multipath fading channels using pilot signals contained in the received RF signal and compensates for the phase shift in each channel and weights each of the despread signals with a factor that is proportional to the signal strength, so that a strong signal carries a larger weight than a weak signal. The weighted channel signals are maximal-ratio combined and decoded in a decoder 7 into a voice signal, for example, for delivery to utilization circuitry, not shown.

Path selector 6 is comprised of a correlator 21 and a plurality of path searchers $22_1$~$22_m$. A plurality of subtractors $24_1$~$24_{(m-1)}$ are connected in a series circuit to the output of correlator 21 to form successive taps to which the path searchers $22_1$~$22_m$ are respectively connected. Therefore, the output of Nyquist filter $23_i$ is subtracted from the input of corresponding subtractor $24_i$ and the output of subtractor $24_i$ is supplied to the input of path searcher $22_{(i+1)}$, where i=1, 2, . . . , m−1.

Preferably, the path selector 6 includes a plurality of Nyquist filters $23_1$~$23_{(m-1)}$ of the same Nyquist frequency, which are provided in correspondence to the path searchers $22_1$~$22_{(m-1)}$ and to the subtractors $24_1$~$24_{(m-1)}$. Each Nyquist filter 23 is connected between the output of the corresponding path searcher and the corresponding subtractor for removing frequency components higher than the Nyquist frequency and applying the remaining lower frequency components to the corresponding subtractor as a Nyquist response.

The outputs of all path searchers $22_1$~$22_m$ are supplied to the demodulator 5 as timing signals representing the arrival times of the channel signals supplied to the RAKE fingers $10_1$~$10_m$.

The received spread spectrum signal contains a unique word, This unique word is despread by the correlator 21 with a predetermined PN code. The output signal of correlator 21 represents a plurality of delay profiles which are a distribution of field strengths whose peak amplitudes and time positions respectively correspond to the strengths and propagation times of multipath fading channels.

The operation of path selector 6 will be given below in quantitative terms.

Basically, the transmit and receive sites of a CDMA communication system can be considered as a system operating with a root Nyquist filter and the system as a whole can be treated as a Nyquist response system. If the transmit signal is denoted as s(t), the transfer function of the transmit and receive filters as g(t) and the interpolation filter as c(t), then the autocorrelation function r(t) of each path searcher 22 is given as follows:

$$r(t)=s(t)\otimes g(t)\otimes c(t)\otimes s(t)$$

If the interpolation filter is an ideal filter, r(t) can be rewritten as:

$$r(t)=s(t)\otimes g(t)\otimes s(t)$$

Since the transmit signal s(t)=±1, r(t) is equal to g(t).

Figure 1:
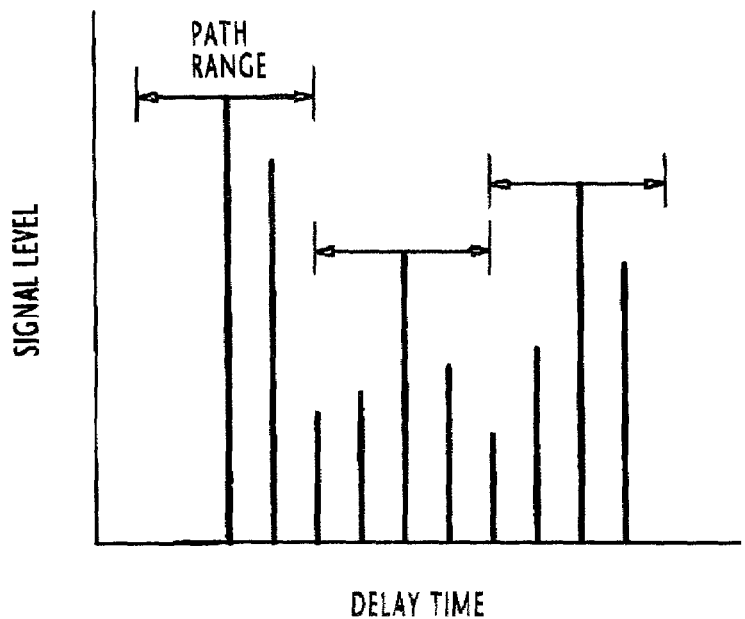
FIG. 1 is a graphic representation of a number of delay profiles of propagation paths with peak amplitudes represented by vertical bars.
Figure 3:
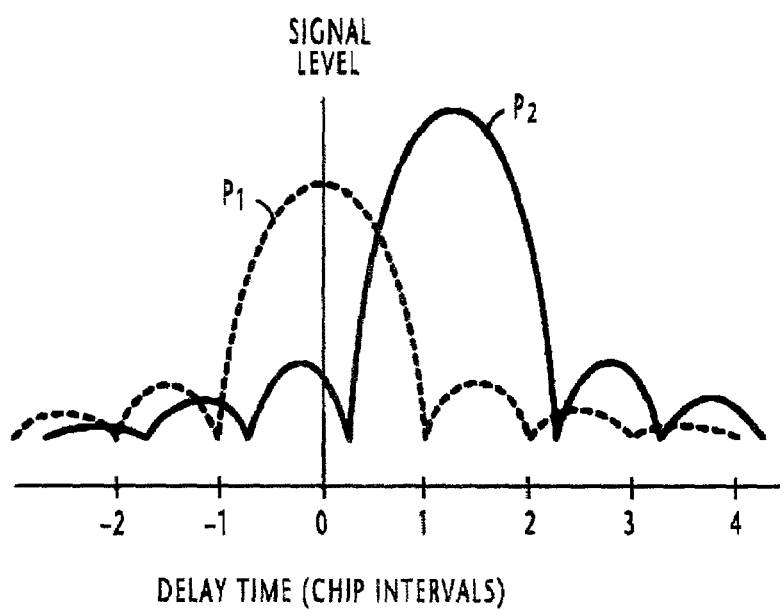
FIG. 3 is a graphic representation of two signals occurring at short delay time intervals for explaining the operation of the present invention.

Assume that there are two propagation paths between which a timing difference of π exists. As shown in FIG. 3, the correlator 21 produces two delay profiles P1 and P2, with profile P2 having a higher peak amplitude than that of profile P1. Therefore, the output of correlator 21 is a sum of autocorrelations for respective propagation paths, i.e., g(t)+g(t−π). It is seen in FIG. 3 that the positions of peak amplitudes of profiles P1 and P2 are so close to each other that mutual interfere can result.

Each path searcher detects the profile of highest peak amplitude from the corresponding tap of the series-connected subtractors 24. Therefore, the path searcher $22_1$ detects the profile P2 and the corresponding Nyquist filter $23_1$ produces a Nyquist response g(t−π) from the detected profile P2. Since this Nyquist response is subtracted from the output of correlator 21, the path searcher $22_2$ detects the profile P1 and the corresponding Nyquist filter $23_2$ produces a Nyquist response g(t) from the profile P1.

Since the delay profile of highest signal power is removed at each successive subtractor, the profile of the next highest signal power can be detected with clear distinction from the remaining profiles. As a result, delay profiles can be clearly separated from each other and delay timing signals for the demodulator can be detected with high resolution even though they are spaced at intervals smaller than the prior art path range. Propagation paths with high correlation values can be advantageously maximal-ratio combined. High frequency utilization and low error rate transmission can be achieved.

What is claimed is:

1. A path selection method comprising the steps of:
   a) producing a plurality of delay profiles from a plurality of propagation paths of a transmitted radio frequency signal, wherein said radio frequency signal is a spread spectrum signal containing a unique word and step (a) comprises despreading the unique word with a predetermined despread code to produce a sum of autocorrelations corresponding to said propagation paths;
   b) detecting a delay profile of highest peak amplitude from said delay profiles, this step comprising selecting one of said autocorrelations from said sum of autocorrelations corresponding to the detected delay profile of highest peak amplitude, and Nyquist-filtering the selected autocorrelation to produce a Nyquist response;
   c) removing the delay profile detected by step (b) from the delay profiles of step (a) by successively subtracting the Nyquist response of step (b) from the sum of autocorrelations produced by step (a); and
   d) repeating steps (b) and (c).

2. A path selector comprising:
   a correlator for producing a plurality of delay profiles corresponding to a plurality of propagation paths of a transmitted radio frequency signal;
   a plurality of subtractors successively connected from the output of said correlator to form a plurality of successive taps;
   a plurality of path searchers respectively connected to said successive taps, each of the path searchers detecting a delay profile of highest peak amplitude from the corresponding tap; and
   a plurality of Nyquist filters corresponding to said subtractors and said path searchers, each of the Nyquist filters producing a Nyquist response from the delay profile detected by the corresponding path searcher and supplying the Nyquist response to the corresponding subtractor.

3. The path selector of claim 2, wherein said radio frequency signal is a spread spectrum signal containing a unique word, and wherein said correlator produces a sum of autocorrelations by despreading said unique word with a predetermined despread code.

4. A spread spectrum receiver comprising:
   a correlator for despreading a received spread spectrum signal and producing therefrom a plurality of delay profiles corresponding to a plurality of propagation paths of the spread spectrum signal;

a plurality of subtractors successively connected from the output of said correlator to form a plurality of successive taps;

a plurality of path searchers respectively connected to said successive taps, each of the path searchers detecting a delay profile of highest peak amplitude from the corresponding tap;

a plurality of Nyquist filters corresponding to said subtractors and said path searchers, each of the Nyquist filters producing a Nyquist response from the delay profile detected by the corresponding path searcher and supplying the Nyquist response to the corresponding subtractor;

a plurality of RAKE fingers for despreading the received spread spectrum signal at delay times respectively determined by the delay profiles detected by said path searchers; and a maximal-ratio combiner for combining output signals of said RAKE fingers.

5. The spread spectrum receiver of claim 4, wherein said spread spectrum signal contains a unique word, and wherein said correlator produces a sum of autocorrelations by despreading said unique word with a predetermined despread code, and wherein each of said path searchers selects a delay profile of highest peak amplitude from the corresponding tap.

* * * * *